Figure 1:
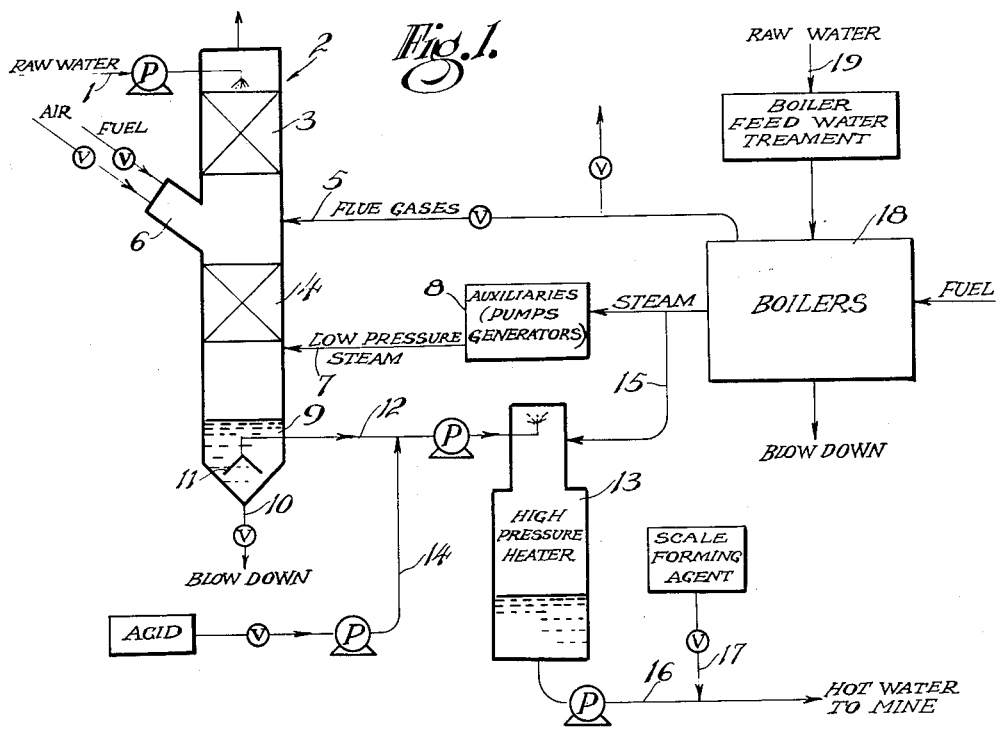

INVENTOR.
Bernard A. Axelrad
Bernard M. Fisher
BY Pollard & Johnston
ATTORNEYS

INVENTOR,
Bernard A. Axelrad
Bernard M. Fisher
BY
Pollard & Johnston
ATTORNEYS

United States Patent Office 2,756,208
Patented July 24, 1956

2,756,208
WATER HEATING PROCESSES FOR SULFUR MINING

Bernard A. Axelrad and Bernard M. Fisher, Freeport, Tex., assignors to Freeport Sulphur Company, New York, N. Y., a corporation of Delaware Application October 24, 1952, Serial No. 316,678

17 Claims. (Cl. 210—14)

This invention relates to processes for heating water in large quantities especially for mining sulfur by the Frasch process and particularly it relates to heating processes applicable to any and all types of naturally occurring water for use in such mining operations.

At the present time water employed in the mining of this element has been heated after first dividing it into two streams process-wise, one of which is used as boiler feed water and the other as mine water. The first mentioned stream is given a relatively severe treatment to the extent necessary to condition it for use as boiler feed water by treatment with suitable chemicals such as the conventional hot lime soda process and, after such treatment is complete, thus purified the water is fed to steam generating boilers of conventional type.

The second stream constituting the mine water is also treated by chemical means such as lime soda but to a lesser extent, also to remove or lessen the content of scale-forming constituents and the thus treated mine water is then mixed with steam from the boilers under pressure to produce the water at the desired temperature for the sulfur mining operation contemplated. The chemical treatments used to date have been the cold lime-soda process, the hot lime-soda process, minor variations of the same, or other standard methods of water treatment designed to give a low residual hardness.

The cold lime-soda process employs hydrated lime and soda ash, with or without a coagulant, to precipitate and settle the hardness in the water. The equipment required includes chemical mixing tanks, feed tanks, chemical feeders, water treating tanks, settling pounds or mechanical precipitators, filters, sludge disposal equipment and many auxiliaries. The hot lime-soda process involves similar chemical treatments and requires the same equipment except that usually no coagulants are required.

Since sulfur mining plants require very substantial quantities of hot water, the above described water treating equipment is quite extensive and the operating costs including that of chemicals are very substantial. Up to the present time no sulfur mining operation has been conducted without these costly water treating plants.

According to one procedure heretofore employed designed to reclaim waste heat from the boilers, part of the mine water is preliminarily contacted with boiler flue gases. The water thus heated, however, has required a subsequent treatment in the lime-soda plant for removal of the carbon dioxide and the scaling constitutents before the same is introduced into the conventional mine water heater. The equipment requirements have not been reduced by the inclusion of this heat reclaiming step.

The general object of the present invention is to provide processes for heating water for sulfur mining purposes which involve very substantial savings in equipment and in operating, chemical and maintenance costs in comparison with present plant practice. A primary general objective is to provide a system whereby water of any salinity can be used for the mine water stream, and utilizing only a small amount of fresh or good quality water for the boiler water stream.

Specific objects are (1) to limit and control deposition of scale to optimum values in the heating equipment and auxiliaries where the same are constructed of non-corrosion resistant materials, (2) to eliminate scale deposition altogether where corrosion resistant materials are used, (3) to convert, in some cases, scale-forming constituents of mine water of higher salt content for the most part into a soft gelatinous material in a form which can be easily washed from the system rather than into a hard scale which adheres tenaciously, (4) to lessen substantially the total water to be treated by hot or cold lime-soda processes, (5) to reduce the amount of steam required for heating the mine water to sulfur mining temperatures, (6) to reduce the total chemical and labor costs for water treatment and (7) to lessen the amount of plant equipment required, all in relation to the mining of sulfur.

Another important object is to make it possible to use water from sources of higher salinity than heretofore utilizable in conventional sulfur mining equipment. Since the hardness or scale forming constituents present in water normally increase in direct proportion to the salt content, the cost of treatment progressively increases and the use of high salt content water has heretofore been impractical. By the present invention it is possible to use water of high salt content for the mine water stream thereby conserving the limited supply of good water for the boiler water stream.

Broadly stated, the invention may be considered to relate to processes for heating scale-forming waters to temperatures of from 250° to 365° F. without any substantial corrosion or excessive deposition of hard scale, and to involve heating the water and raising its temperature part way to said level by introducing hot combustion gases directly into contact with said water, reducing the alkalinity of the water to a pH value below about 7.2 and thereafter raising the water at a pH value of 6.6–7.2 to the final temperature within said range by introducing thereinto steam under pressure, thereby providing hot mine water for the recovery of sulfur.

The scale-forming water to which the invention is applicable includes all naturally occurring water, such as sea, river, well, lake and bayou waters which generally have a pH value from 7.2 to 8.5. However, when water of very high content of scale-forming constituents is treated, the highest temperature within the range stated may not be attainable without causing excessive scale deposition. Sea water and other waters of intermediate salinity may be heated to sulfur mining temperatures within the specified range, but as the salinity increases the maximum permissible temperature decreases somewhat.

The adjustment in alkalinity may be carried out in several different ways, depending upon the nature or source of the raw water treated, its degree of alkalinity and various other factors. The waters are of two general types, i. e., those waters whose alkalinities are due primarily to the presence of calcium and magnesium compounds referred to herein as "Type I," mostly surface waters, and those waters whose alkalinity is due in part to high soda ash content, referred to herein as "Type II," of which the usual well water is an example. Typical analyses of examples of these types are set out in the following table:

| | Type I | Type II |
|---|---|---|
| Salt as G. P. G. of NaCl | 10–600 | 5–50 |
| Phenolphthalein Alkinity as G. P. G. $CaCO_3$ | <1.6 | 1–0 |
| Total Alkalinity as G. P. G. $CaCO_3$ | 2.10 | 10–40 |
| pH | 7.2–8.4 | 8–9 |
| Ca, p. p. m | 20–300 | 10–50 |
| Mg, p. p. m | 20–500 | 10–40 |

In accordance with a preferred general embodiment of the invention for the treatment of waters of Type I, the preliminary heating with combustion gases serves the supplementary function of introducing the acidifying agent (carbon dioxide) into the water in a quantity which reduces the pH value to the desired level. Hence the initial heating and pH value reduction are here accomplished by one and the same step. To maintain the pH value due to $CO_2$ absorption at this level, the water cannot without the application of pressure be heated by the combustion gases to a temperature above about 140° F.

In accordance with a second general embodiment, the above mentioned process is supplemented by introducing into the preliminarily heated water a quantity of any suitable acid, examples of which are sulfur acid compounds (sulfuric, or $SO_3$ and sulfurous, or $SO_2$) and hydrochloric acid, preferably in liquid form. These compounds may be referred to as mineral acids and substances providing mineral acids in aqueous solution. By such additions, the water can be successfully heated to a temperature up to about 195° F. by combustion gases in atmospheric heaters or to higher temperatures in low superatmospheric pressure equipment. Acidification can be assisted by introducing sulfur dioxide, or gases containing the same, into the heating tower, as for example by adding sulfur burner gas to the combustion gas stream being introduced into the tower. The sulfur dioxide serves the additional function of decreasing corrosion tendencies of the water by taking up the free oxygen therein.

This second procedure is applicable to the treatment of waters of Type II as well as to those of Type I. When Type I waters are treated, the pH of the water is preferably so adjusted that it will be between 7.0 and 7.2 as it enters the final heating stage wherein it is heated from about 200° F. to the final temperature, whereas when Type II waters are heated, reduction of the pH to 6.8 may be required. The specific adjustment of pH value utilizable in any particular operation can be determined only by trial and error based upon actual observation of scale formation and corrosion tendencies of the acid treated hot water. Ordinarily, the regulation of the pH values is such as will provide a level of incipient scale formation from the particular water being heated at the time. By this procedure, a very thin scale may be caused to deposit in the high pressure heating system including the pumps, valves and pipes, thereby lessening corrosion and prolonging the periods of continuous operation and extending the life of the equipment. This scale may reach a thickness mounting only to about one thirty second of an inch after an operation period of several months.

The preliminary heating of the mine water may be accomplished in several different ways depending in part upon the availability of heat sources in the particular boiler plant at hand or contemplated. Also the possible temperature to which the water may be heated in the preliminary steps may vary in relation to the heat values available, and may range between 110° and 210° or 220° F. in open heaters.

The several specific embodiments of the invention hereinafter described provide procedures and equipment capable of taking best advantage of heat sources and heat balances of various boiler installations.

The embodiments are illustrated in the accompanying drawings which are wholly diagrammatic.

With reference to Figure 1 illustrating the first embodiment, raw naturally occurring water is pumped through the conduit 1 and sprayed into the heating column 2 wherein it flows successively through packing 3 and packing 4 to the bottom of the tower. In passing through the packing 3 the water is initially heated by combustion gases introduced into the tower at an intermediate point, such gases being either waste flue gases introduced by means of the conduit 5 or higher temperature or burner gases produced by the introduction of air and fuel into the burner 6.

The water may be heated by means of the combustion gases to a temperature suitably ranging from 110° to about 195° F. The heated water in passing downwardly through the tower is thereupon heated by low pressure steam introduced by the conduit 7 into the side of the tower at a point below the packing 4. This low pressure steam is derived from pumps, generators and other auxiliary equipment employed in the plant installation, such equipment being indicated at 8. This low pressure steam may raise the temperature of the water to a level of from 210 to 220° F.

The water thus heated flows to a settling zone 9 in the bottom of the heating tower. Here suspended matter including organic material, diatoms and the like coagulates and settles to the bottom in a pool and may be continuously or periodically removed through the valved blow down conduit 10, thus preventing it from becoming scale forming constituents later in the process. The thus purified partially heated water flows from the top of the sludge cone 11 out of the tower in conduit 12 and is pumped to the high pressure heater 13. In passing through the conduit 12 a small amount of an acid substance in carefully proportioned amounts may be introduced thereinto by means of the conduit 14 to reduce the pH value of the water to 6.8–7.2, if the water is not already at such value.

The water introduced into the heater 13 in the form of a spray is heated by contact with high pressure steam introduced by the conduit 15. In the heater the steam condenses in the water and the water is raised to the finally desired higher temperature between about 250 and 365° F. Water flows from the said heater through conduit 16 to the sulfur mine. Since the water at this point normally is not scale forming, it is generally desirable that a small amount of alkali, suitably soda ash or caustic be introduced in order to form a protective coating in the pipe lines leading to and into the mine. In the place of an alkali, some salt capable of forming an insoluble compound when added to the water, as, for example, phosphates, barium chloride and the like, may be employed. Accordingly the alkali is introduced through the conduit 17 into the pipe line 16 in an amount which will bring about the formation of a thin scale. The proper amount can be ascertained by conventional methods.

The steam for the heating of the mine water is produced in the boilers 18 in conventional manner and the waste flue gases therefrom are used for the initial heating step. The raw water for the boilers is introduced in the conduit 19 and is first treated in conventional manner as by a lime-soda treatment for removing scale forming constituents. The amount of water employed for this purpose is small in relation to the amount of mine water heated in the system. In preferred operations under this embodiment, the water heated by the flue gases will have a temperature of 80–120° F. and a pH value of 6.4–6.7; the water heated by the exhaust steam will have a temperature of 200–210° F. and a pH value of 6.8–7.2 when introduced into the high pressure steam heater; and the water in the final heater will have a temperature of 365° F. and a pH value of 6.6–7.0.

Figure 2:
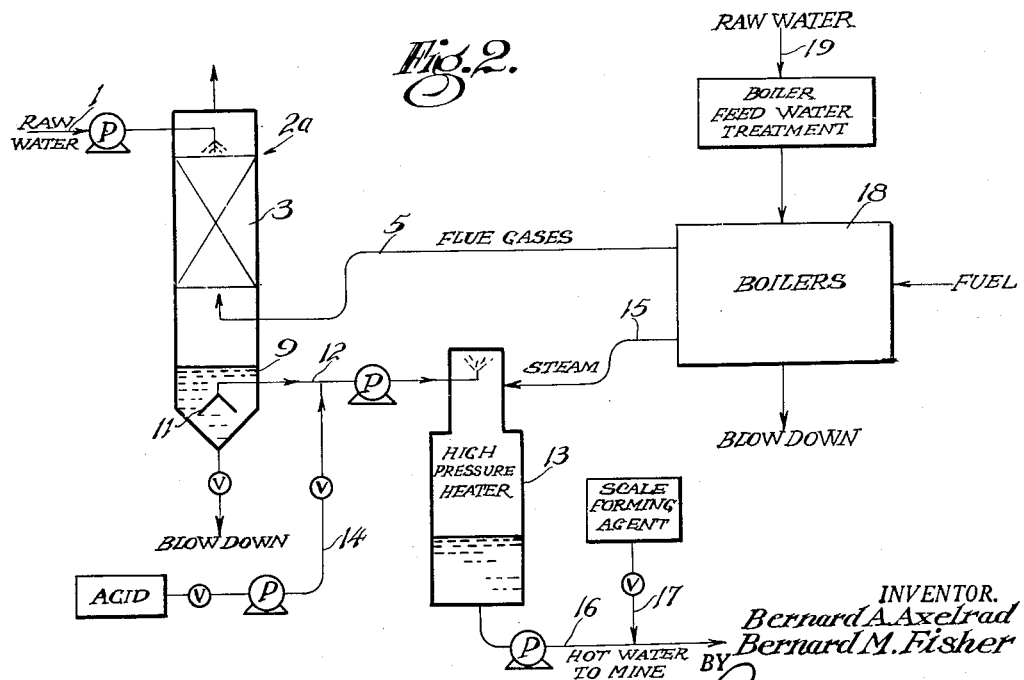

In the embodiment illustrated in Figure 2, the tower 2a is provided with a single packed area and the preliminary heating therein is accomplished solely by means of waste flue gases obtained from the boilers 18. With this arrangement more of the heat is supplied by the high pressure steam heater.

Figure 3:
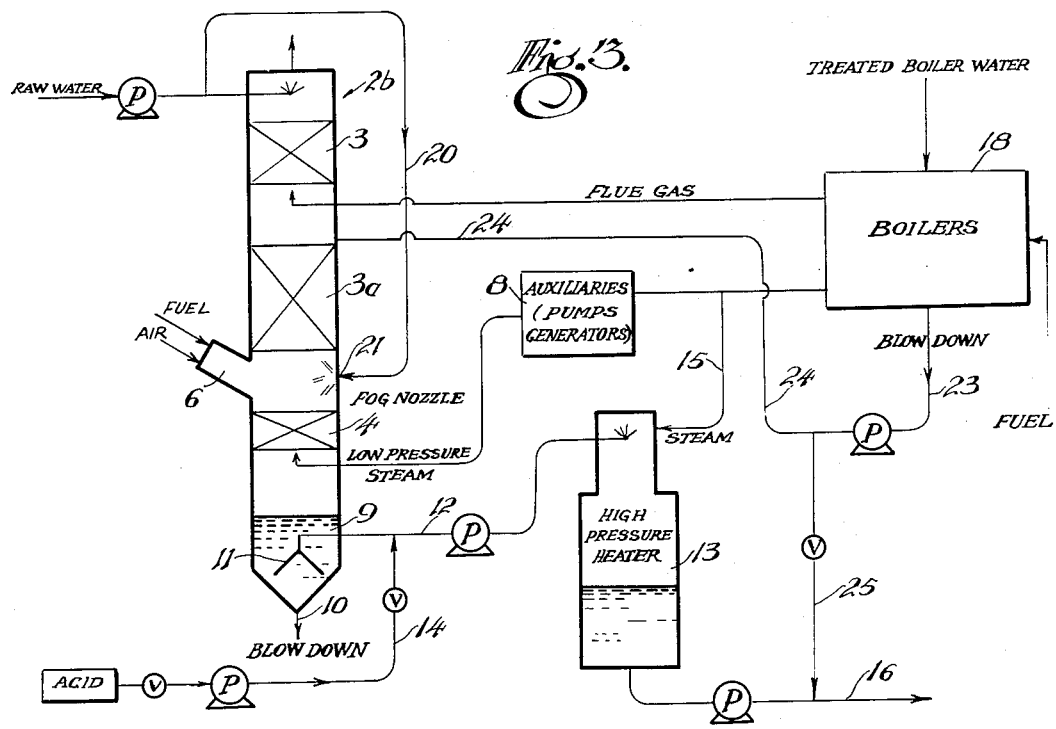

In the third embodiment illustrated in Figure 3, the raw water is introduced into a lower 2b divided into three sections each containing a packing. In the top section the mine water is initially heated with waste flue gases suitably to a temperature of 100° to 140° F. Thereupon the water flowing downwardly through the tower is heated in the second section 3a by means of burner gases suitably to a temperature of from 175° to 190° F. A small amount of raw water from the conduit 1 is conducted through the by-pass pipe 20 and is introduced into the tower at an intermediate point through fog nozzles 21 at substantially the same level as that at which the burner gases are introduced, and by which step part of the heat of the gases is quickly taken up in the dispersed water.

The thusly heated water flowing downwardly through the tower is finally heated therein in the third packed section by contact with low pressure steam suitably to a temperature of from 200° to 210° F. In this embodiment the blow down from the boilers 18 is utilized in either one or both of two ways. The blow down leaving the boiler in the conduit 23 may be divided, and part of it pumped through the conduit 24 and introduced into the heating column 2b ordinarily at a point where the same will be thereafter subjected to heat supplied by combustion gases, the point of introduction being illustrated at a level where the water has been heated by waste flue gases but is yet to be heated by burner gases. The utilization of the boiler blow down in this manner conserves a considerable amount of heat. In some instances it is advantageous to introduce part of the blow down into the tower at a level below that at which the combustion gases are introduced. By adding the blow down under packing 4, for instance, the alkalinity of the blow down is not reduced by exposure to the combustion gases and the pH of the water can be increased, if desired, by this change in point of addition of the blow down. In addition to these possible alternatives, part of the blow down may be utiilzed for adjustment of the alkalinity of the hot water flowing to the mine for causing the thin scale deposition, and this transfer may be accomplished by the conduit 25 leading to the pipe line 16.

This third embodiment has the advantage over the other embodiments in that less steam is required from the boilers and hence less boiler feed water needs to be chemically treated.

Figure 4:
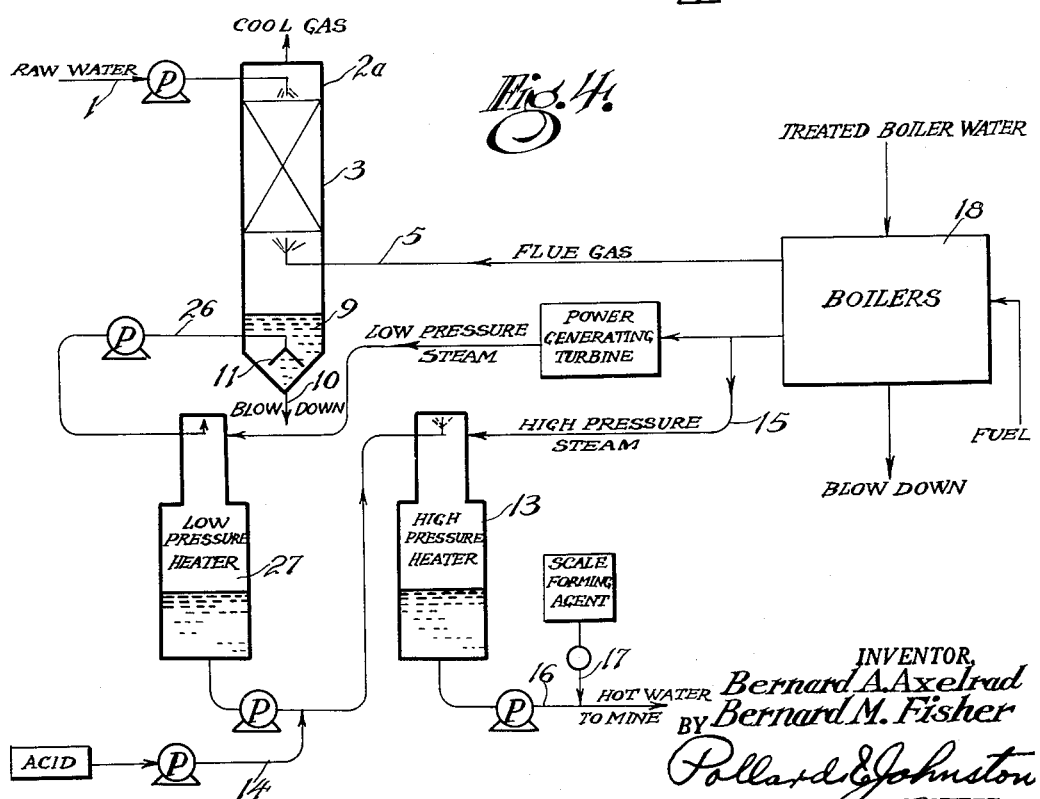

In the fourth embodiment illustrated in Figure 4 the raw water is initially heated in a column similar in size and construction to column 2a illustrated in Figure 2. In this variation of the process, the water heated by means of flue gases in the tower 2a is thereafter conveyed through the conduit 26 to an intermediate or lower pressure steam heater 27 which may be similar in construction to the high pressure heater 13 but supplied with steam of up to 20 pounds pressure obtainable as from a power generating turbine exhaust. In this embodiment the water may be heated by means of the flue gases to temperatures suitably between 80 and 160° then to higher temperatures by means of steam in the heater 27 up to 200–260° F., and finally to the end temperature of from 250°–365° F. upon being passed to and through the high temperature steam heater 13.

The equipment of this fourth embodiment can be altered to provide a slightly different procedure by operating heater 27 as an open vessel and introducing low pressure steam from pumps and other auxiliaries as used in the other embodiments. The high pressure steam heating operation may be accomplished in two or more units, if so desired, and this change can be used in connection with each of the described embodiments.

In the procedures hereinbefore described wherein the water is heated in the preliminary heater or heaters to a temperature of about 210° F. for the introduction into the high pressure steam heater at such temperature, the pH of the water should preferably be at a value of from 6.8 to 7.2. Adjustment of the pH of the water to this range can be effected (1) solely by the absorption of carbon dioxide from the combustion gases in proper amounts, or (2) by the absorption of carbon dioxide from such gases in insufficient amount and adding other acid in proper amount through the conduit provided therefor, or (3) by the absorption of excessive carbon dioxide from such gases thereby producing pH value of, for example, 6.4 to 6.6 and then increasing the value (a) by venting off part of the carbon dioxide, or (b) by venting off an excessive amount of the carbon dioxide and adding other acid to obtain the desired pH value within said range, or (c) by adding boiler blow down or suitable alkali.

Some of the waters which have been successfully treated by processes of the present invention are described in the following table, wherein samples A and B were brackish surface water, samples C and D were fresh surface water, and samples E and F were high soda ash well water.

| Run | A | B | C | D | E | F |
| --- | --- | --- | --- | --- | --- | --- |
| Salt, G. P. G. NaCl | 536 | 170 | 40.5 | 97 | 21.0 | 21.4 |
| Pht. Alk., G. P. G. CaCO$_3$ | 0.5 | 0.4 | | 0.5 | 1.0 | 1.0 |
| Total Alk. G. P. G., CaCO$_3$ | 5.8 | 6.2 | 7.0 | 6.5 | 18.5 | 17.2 |
| pH | 7.5 | 7.8 | | 8.1 | 8.5 | |
| Ca, p. p. m | 204 | 79 | 36.5 | 57.6 | 26.6 | |
| Mg, p. p. m | 412 | 127 | 44.1 | 80.7 | 19.3 | |
| So$_4$, p. p. m | 882 | 290 | | 197 | | |
| Soda Ash Content, G. P. G. as CaCO$_3$ | | | | | 10.6 | |

*Example 1*

Raw water of the analysis of run A above was introduced at the rate of 10 gallons per minute and at a temperature of 85° F. into column 2 (Lumnite cement lined) of the equipment diagrammatically illustrated in Figure 1. The water flowed through the upper packed section 3 containing a 40-inch layer of one-inch Berl saddles and became heated to a temperature of 190° F. by contact with hot combustion gases produced in the burner 6. The water thereupon passed downwardly through the lower packed section 4 containing a 16-inch layer of one-inch saddles and therein became heated to 210° F. by contact with and condensation of, low pressure exhaust steam introduced by the conduit 7. The steam was introduced under a three-pound pressure. The spent gases left the top of the tower 2 at a temperature of 95° F.

The preliminarily heated water descended to the pool 9 in the bottom of the tower wherein coagulated suspended matter settled to the bottom. The thus partially purified water was then pumped through the conduit 12 to the high pressure heater 13 constructed of steel and coated inside with tin and in its passage hydrogen chloride was added at the rate of 0.05 pound per one thousand gallons of water thereby reducing the pH value of the water to about seven.

In the heater 13 the temperature of the water was raised to 325° F. by the introduction of high pressure steam from the conduit 15 leading from the boilers 18.

The hot water leaving the high pressure heater 13 was thereupon pumped through the pipe line 16 to the sulfur mine. Sodium carbonate was introduced into the line 16 at the rate of about 0.04 pound per one thousand gallons to cause the formation of a light protective scale on the said line.

At the end of seventeen days the system was inspected and no hard scale was found. Instead, a gel-like material appeared which was easily flushed out with steam requiring that the system remain out of operation only a short time. Inspection also revealed that there was no significant corrosion in the system.

*Example 2*

A raw water having the approximate analysis of that described in run E in the table hereinbefore set out was forced through the system defined in Figure 1 and heated in the upper section to 128° F. by contact with waste boiler flue gases and to a temperature of 210° F. in the bottom section of the tower by contact with exhaust steam under three pounds pressure.

Upon leaving the tower 2 sulfur dioxide gas was introduced into the water at the rate of 0.7 pound per thousand gallons thereby reducing the pH value of the water to about 6.8.

After the water was heated to about 325° F. in the high pressure heater 13, soda ash was introduced into the water at the rate of 0.1 pound per thousand gallons.

Later inspection of the system revealed that no scale deposition and no material corrosion had occurred at the end of two weeks constant use. Inspection also revealed that the soda ash addition had produced a thin, hard protective scale in the lines leading to the sulfur well.

The processes of the instant invention have many advantages over conventional practice. The new procedures eliminate the necessity for treating the mine water with softener. The total water requiring treatment by hot or cold lime-soda process is reduced by 60 to 80%. Chemical costs are greatly reduced.

The processes also have the advantage that by heating the water preliminarily to 190° F. in the tower, the steam required for the heating of the water is reduced by about 25%.

The instant processes make it possible to use saline waters for sulfur mining which would be prohibitively expensive if they were treated by the processes now in use.

The instant processes require less plant equipment than conventional processes. Also the operating cost and thermal efficiency is increased.

The instant invention is of considerable advantage in that several alternative procedures are available for the utilization of various heat sources to take advantage of any over-all plant heat balance and design, and to meet the varied requirements for heating any of the various types of raw water encountered.

Although the processes of the present invention have been designed particularly for the heating of water for use in the mining of sulfur, it will be readily apparent that the processes may be employed in various other fields where large amounts of hot water are needed.

It should be understood that the instant invention is not limited to the specific details as to procedures and conditions herein set forth, but that it extends to all variations and alternatives which will occur to those skilled in the art upon consideration of the procedures disclosed or claimed herein.

We claim:

1. A process for providing hot process water at temperatures of from 250° to 365° F. without causing substantial corrosion or objectionable deposition of hard scale, from naturally-occurring alkaline waters having a salt content which precipitates scale-forming constituents when heated to such temperature which comprises, raising the temperature of said water part way to said level by introducing hot combustion gases directly into contact with said water whereby carbon dioxide is also taken up therein, reducing its pH value to a level of about 6.8–7.2, thereafter raising its temperature under pressure to a level within said range by introducing thereinto steam under pressure and finally flowing the water still containing substantially its whole scale-forming content to a point of consumption.

2. A process for heating naturally-occurring alkaline scale-forming water to temperatures of from 250° to 365° F. without excessive corrosion or deposition of hard scale which comprises, reducing the pH value of said water to a level below 7.2 and raising its temperature a substantial part of the way to said level, both by introducing hot $CO_2$-containing combustion gases directly into contact with said water, thereafter raising its temperature under pressure while at a pH value of 6.6–7.2 to a level within said temperature range by introducing thereinto steam under pressure and finally flowing the water still containing substantially its whole scale-forming content to a point of consumption.

3. A process for heating alkaline scale-forming water to temperatures of from 250° to 365° F. without excessive corrosion or deposition of hard scale which comprises, raising the temperature of said water part way to said level by introducing hot combustion gases directly into contact with said water, adding an acidic material selected from the group consisting of mineral acids and substances producing mineral acids in aqueous solution, to said water in a quantity which together with carbon dioxide taken up from the combustion gases reduces the pH of the water to a value of about 6.8–7.2, and thereafter raising its temperature under pressure to a level within said range by introducing thereinto steam under pressure.

4. A process for heating scale-forming water to temperatures of from 250° to 365° F. without excessive corrosion or deposition of hard scale which comprises, raising the temperature of said water part way to said level by introducing hot combustion gases directly into contact with said water whereby carbon dioxide is also taken up therein, raising the temperature of the water an additional substantial part of the way to said level by introducing exhaust low pressure steam directly into contact with said water, reducing its pH value from a level above 7.2 to a level of about 6.8–7.2 and thereafter raising its temperature under pressure to a level within said range by introducing thereinto high-pressure steam.

5. A process for heating naturally-occurring alkaline scale-forming water to temperatures of from 250° to 365° F. without excessive corrosion or deposition of hard scale which comprises, raising the temperature of said water part way to said level by introducing waste flue gases directly into contact with said water whereby carbon dioxide is also taken up therein, raising the temperature of said water an additional part way to said level by introducing high temperature burner gases directly into contact with said water, raising the temperature of the water an additional substantial part of the way to said level by introducing exhaust low pressure steam directly into contact with said water, reducing its pH value to a level of about 6.8–7.2, and thereafter raising its temperature under pressure to a level within said range by introducing thereinto high-pressure steam.

6. A process for heating alkaline scale-forming water to temperatures of from 250° to 365° F. without excessive corrosion or deposition of hard scale which comprises, introducing said water into a heating tower at a high level therein and flowing the same out of the tower at a lower level thereof, introducing hot combustion gases into said tower at an intermediate level thereof and into direct contact with said water flowing through said tower whereby the temperature of said water is raised part way to said temperature level and carbon dioxide is taken up therein, reducing the pH of said water to a value of about 6.8–7.2, and thereafter raising its temperature under pressure to a level within said range by introducing thereinto steam under pressure.

7. A process for heating alkaline scale-forming water to temperatures of from 250° to 365° F. without excessive corrosion or deposition of hard scale which comprises, introducing said water into a heating tower at a high level therein and flowing the same out of the tower at a lower level thereof, but above the bottom thereof whereby a sediment collecting pool is maintained in the bottom portion of said tower, introducing hot combustion gases into said tower at an intermediate level thereof and into direct contact with said water flowing through said tower whereby the temperature of said water is raised part way to said temperature level and carbon dioxide is taken up therein, reducing the pH of said water to a value of about 6.8–7.2, and thereafter raising its temperature under pressure to a level within said range by introducing thereinto steam under pressure, and removing from the tower the sediment collected in the bottom portion thereof.

8. A process for heating alkaline scale-forming water to temperatures of from 250° to 365° F. without excessive corrosion or deposition of hard scale which comprises, introducing said water into a heating tower at a high level therein and flowing the same out of the tower at a lower level thereof, introducing hot combustion gases into said tower at an intermediate level thereof and into direct contact with said water flowing through said tower whereby the temperature of said water is raised part way to said temperature level and carbon dioxide is taken up therein, introducing exhaust low pressure steam into said tower at a lower intermediate level thereof and into direct contact with the partially heated water flowing through said tower, the temperature of the water being raised an additional part way to said temperature level, reducing the pH of said water to a value of about 6.8–7.2, and thereafter raising its temperature under pressure to a level within said range by introducing thereinto high pressure steam.

9. A process for heating scale-forming water to temperatures of from 250° to 365° F. without excessive corrosion or deposition of hard scale which comprises, raising the temperature of said water to 110–220° F. by introducing heating gases composed at least in part of combustion gases directly into contact with said water, reducing its pH value to a level of about 6.8–7.2, and thereafter raising its temperature under pressure to a level within said range by introducing thereinto steam under pressure.

10. A process for heating scale-forming water to temperatures of from 250° to 365° F. without excessive corrosion or deposition of hard scale which comprises raising the temperature of said water to 110–190° F. by introducing hot combustion gases directly into contact with said water, raising the temperature of said water to 195–220° F. by introducing exhaust low pressure steam directly into contact with said water, reducing its pH value to a level of about 6.8–7.2, and thereafter raising its temperature under pressure to a level within said range by introducing thereinto high pressure steam.

11. A process for heating scale-forming surface water to temperatures of from 250°–365° F. without exessive corrosion or deposition of hard scale which comprises, raising the temperature of said water to 180°–190° F. by introducing high temperature burner gases directly into contact with said water flowing in countercurrent direction through a tower, raising the temperature of said water to about 210° F. by introducing exhaust low pressure steam directly into contact with said water flowing through said tower, flowing the thusly heated water from said tower, reducing the pH of said water to a level of about 7, and thereafter raising its temperature under pressure to a level within said first mentioned range by introducing thereinto high pressure steam.

12. A process for heating scale-forming well water without excessive corrosion or deposition of hard scale which comprises, raising the temperature of said water to a temperature of 100°–140° F. by introducing waste flue gases into direct contact with said water flowing in countercurrent direction through a tower, raising the temperature of said water to a temperature of about 210° F. by introducing exhaust low pressure steam into direct contact with the partially heated water flowing through said tower, withdrawing the thusly heated water from said tower, reducing the pH of said water to a level of about 6.8 and raising its temperature under pressure to a level of from 250° to 365° F. by introducing thereinto high pressure steam.

13. A process for heating scale-forming water to high temperatures without excessive corrosion or deposition of hard scale which comprises raising the temperature of said water to 100°–140° F. by introducing waste flue gases directly into contact with said water, raising the temperature of said water to 140°–190° F. by introducing high temperature burner gases directly into contact with said water, raising the temperature of said water to 195°–220° F. by introducing exhaust low pressure steam directly into contact with said water, reducing the pH value of said water to a level of about 6.8–7.2 and thereafter raising the temperature of the water under pressure to a level of from 250° to 365° F. by introducing thereinto high pressure steam.

14. A process for heating alkaline scale-forming water to temperatures of from 250° to 365° F. without excessive corrosion or deposition of hard scale which comprises, introducing said water into a heating tower at a high level therein and flowing the same out of the tower at a lower level thereof, introducing hot combustion gases into said tower at an intermediate level thereof and into direct contact with said water flowing through said tower whereby the temperature of said water is raised part way to said temperature level and carbon dioxide is taken up therein, raising the temperature of said water an additional substantial part of the way to said level by introducing low pressure steam directly into contact with said water, reducing the pH of said water to a value of about 6.8–7.2 and thereafter raising the temperature of the water under pressure to a level within said range by introducing thereinto high pressure steam.

15. A process for heating scale-forming surface water to temperatures of from 250° to 365° F. without excessive corrosion or deposition of hard scale which comprises, adjusting the pH value of said water to a level of about 7 and raising its temperature to a level of from 110° to 140° F. by introducing hot combustion gases directly into contact with said water whereby carbon dioxide absorbed in the water supplies the acid required for the reduction in pH value, and thereafter raising its temperature under pressure to a level within said first mentioned range by introducing thereinto steam under pressure.

16. A process for heating alkaline scale-forming water to temperatures of from 250° to 365° F. without excessive corrosion or deposition of hard scale which comprises, raising the temperature of said water part way to said level by introducing hot combustion gases directly into contact with said water whereby carbon dioxide is also taken up therein, introducing sulfur dioxide into said water in a quantity which together with carbon dioxide taken up from the combustion gases provides the acidity for reducing the pH of the water to a value of about 6.8–7.2, and thereafter heating the resulting water and raising its temperature under pressure to a level within said range by introducing thereinto steam under pressure.

17. A process for preparing alkaline scale-forming water for utilization in the mining of sulfur without causing excessive corrosion or deposition of hard scale in the mine water heating apparatus which comprises, heating said water substantially at atmospheric pressure by introducing hot combustion gases directly into contact with said water whereby carbon dioxide is also taken up therein, reducing its pH value to a level of about 6.8–7.2, thereafter raising its temperature under pressure to the level desired for the mining operation by introducing thereinto steam under pressure and finally adding a scale-forming agent to the hot water thusly obtained in a quantity which causes the formation of a thin hard protective scale in the pipe lines leading to the sulfur well.

References Cited in the file of this patent

UNITED STATES PATENTS

| | | |
|---|---|---|
| 229,090 | Burgess | June 22, 1880 |
| 369,288 | Hyatt | Aug. 30, 1887 |
| 443,186 | Alberger | Dec. 23, 1890 |
| 532,884 | Leffler | Jan. 22, 1895 |
| 599,983 | Gunning | Mar. 1, 1898 |
| 653,741 | Jewell | July 17, 1900 |
| 747,509 | Thurmond | Dec. 22, 1903 |
| 1,413,937 | Savory-Carlier | Apr. 25, 1922 |
| 2,066,348 | Hays | Jan. 5, 1937 |
| 2,182,286 | Doenecke et al. | Dec. 5, 1939 |
| 2,227,520 | Tiger | Jan. 7, 1941 |
| 2,342,201 | Kain | Feb. 22, 1944 |
| 2,394,643 | Switzer | Feb. 12, 1946 |

FOREIGN PATENTS

| | | |
|---|---|---|
| 349,567 | Great Britain | May 13, 1931 |
| 478,090 | Great Britain | Jan. 12, 1938 |